United States Patent
Verkyk

(12) 
(10) Patent No.: US 6,652,190 B1
(45) Date of Patent: Nov. 25, 2003

(54) METHOD TO INSTALL UNDERGROUND PIPE CASING

(76) Inventor: Robert J. Verkyk, 10401 Green Hedges Dr., Tampa, FL (US) 33626

( * ) Notice: Subject to any disclaimer, the term of this patent is extended or adjusted under 35 U.S.C. 154(b) by 0 days.

(21) Appl. No.: 10/065,682

(22) Filed: Nov. 8, 2002

(51) Int. Cl.[7] ............................... F16L 1/036
(52) U.S. Cl. ................... 405/184; 175/62; 405/145; 405/146
(58) Field of Search ............... 405/138, 141, 405/145, 146, 184, 184.3; 175/62

(56) References Cited

U.S. PATENT DOCUMENTS

| | | | | |
|---|---|---|---|---|
| 3,742,718 A | * | 7/1973 | Weiss et al. | 405/184 |
| 4,557,627 A | * | 12/1985 | Schmid et al. | 405/146 |
| 6,109,832 A | * | 8/2000 | Lincoln | 405/184 |
| 6,357,967 B1 | * | 3/2002 | Putnam | 405/184.3 |

* cited by examiner

*Primary Examiner*—Robert E. Pezzuto
*Assistant Examiner*—Tara L. Mayo
(74) *Attorney, Agent, or Firm*—Malin, Haley & DiMaggio, P.A.

(57) ABSTRACT

A method and apparatus for installing a pipe casing underground without a trench for distances up to 400 feet with pipe casing up to 168 inches in diameter. The system uses a modified high energy piling hammer to mobilize the energy to drive the casings or tubings that make up the instant tunnel. An example of a piling hammer used in the present invention is the IHC Hydrohammer line of models in between the S-90 and S-280. Specific models planned to be used in this invention, depending on diameter and length requirements and type of soil in the planned alignment, are the Models S-90, S-150, S-280, S-400 and S-500. The present invention's Hydrohammers are needed to be held against the casing pipe to be driven with a force equal to the reactional force of the hammer during recharging of the hammer's system. A special helmet and cutting head increase operational capabilities.

11 Claims, 6 Drawing Sheets

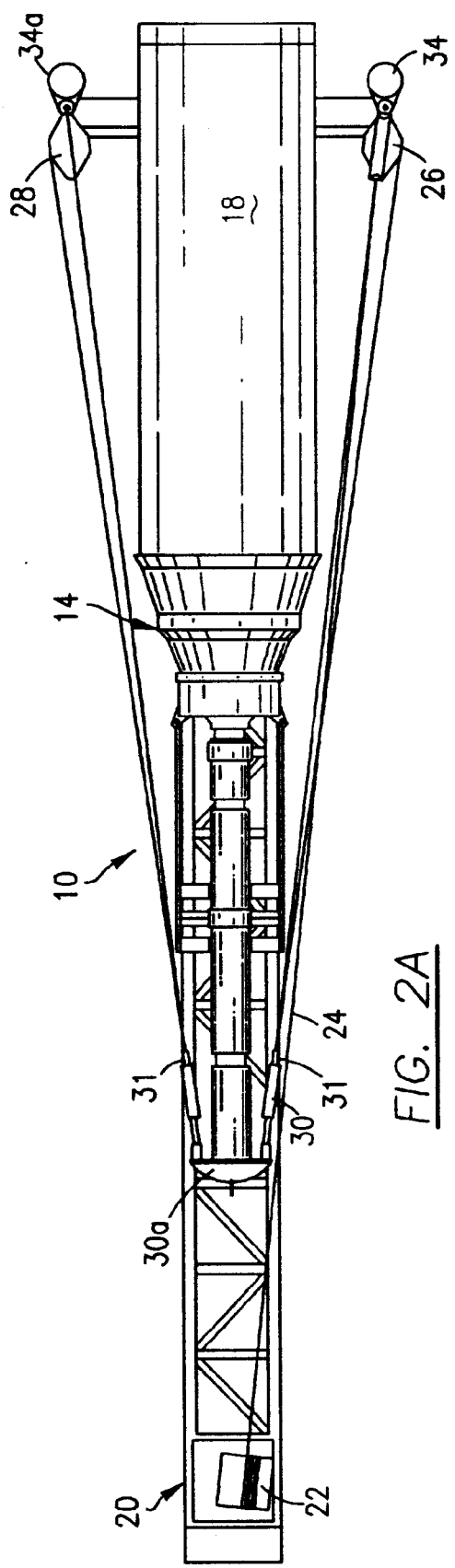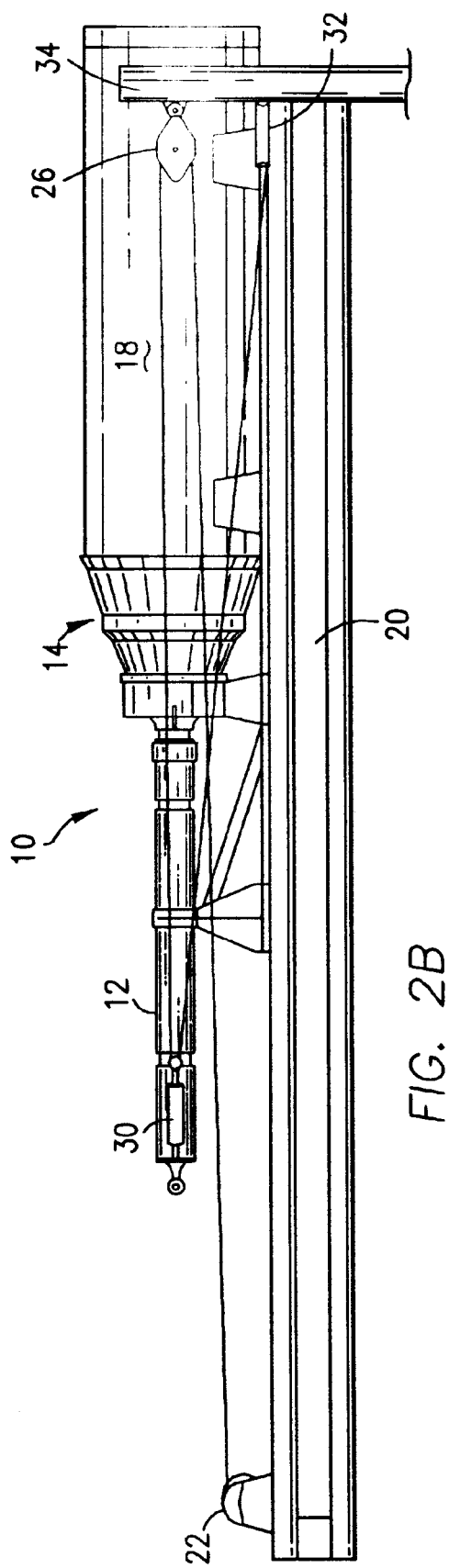

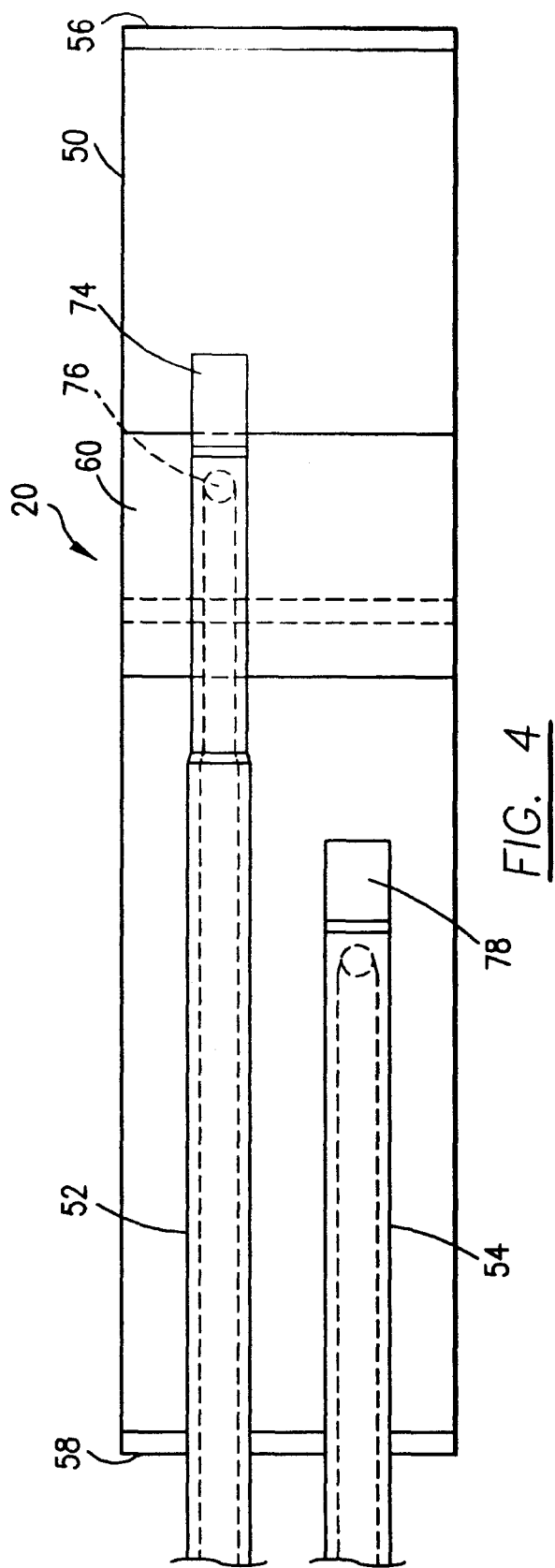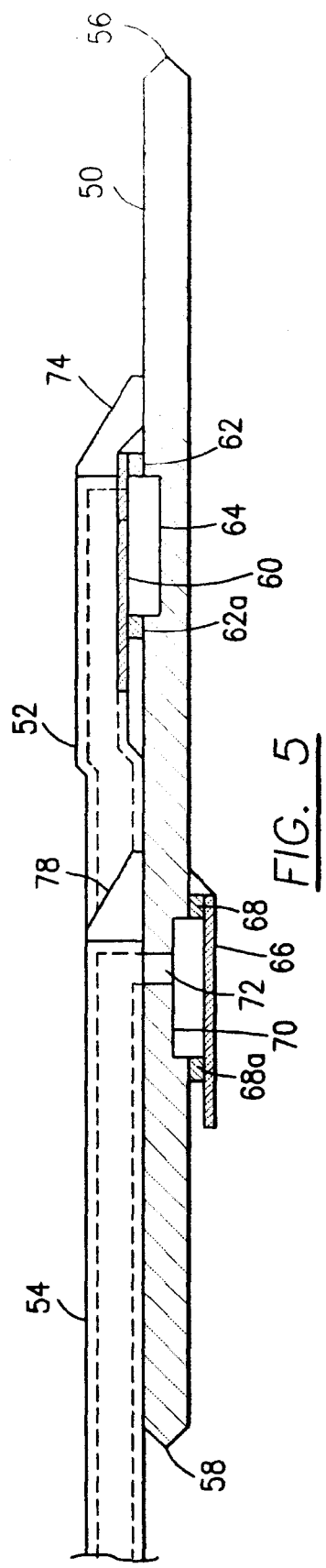

METHOD TO INSTALL UNDERGROUND PIPE CASING

BACKGROUND OF INVENTION

1. Field of the Invention

The present invention relates to the field of trenchless tunneling by jacking or ramming pipe casing of large diameter over long distances, especially with respect to the installation of 100–400 feet of pipe casing which is larger than 72 inches in diameter.

2. Description of Related Art

There are various methods currently used to install underground pipe without digging trenches, commonly referred to as trenchless tunneling. These methods use pipe ramming and jacking, tunnel boring machines, or Micro-Tunneling.

Trenchless tunneling methods use tunnel boring machines (TBM) that include a boring shield that either pushes itself forward with completed extruded segments either made from precast concrete or bolted steel panels. Variation on the boring method has the TBM or mole mounted on or in front of the first casing pipe that is thereafter pushed into the formed tunnel with large hydraulic jacks. As these tunnel boring machines move forward through the ground, the soil is removed and typically mixed with a fluid and the mixture pumped out of the tunnel into a separation plant, wherein the solids are separated from the fluids. These methods do not work well in shallow applications, depending on soil type. A minimum industry standard requirement is a cover over the tunnel to be installed of at least two times the machine diameter. Tunnel boring is very slow and very expensive because of the type of equipment required.

TBM or Micro-tunneling involves underground trenchless tunneling in which energy is used to excavate the soil loose during the tunneling operation for soil removal. Again, Micro-tunneling is very slow in terms of the time required to create a tunnel and can be quite expensive Trenchless tunneling methods that use pipe ramming or pipe jacking are known. The method typically uses a casing liner that is pushed underground into the tunnel by either a pneumatic ramming hammer, a set of hydraulic rams in tandem, or a combination of the two. The tunnel is typically started in a jacking pit that is dug to a depth to which a casing pipe or tunnel liner will be placed under the ground.

Capacities of currently employed ramming hammers and jacking pipe casing installations to date have been limited in capacity, such as total length or pipe size, requiring internal excavation as sections of pipe are installed in the tunnel. The ramming hammers and jacking rams have not had sufficient force for extended long tunnels with large diameters such as 6 ft. through 12 ft. for extended long tunnels above 100 feet because of the immense friction encountered as the pipe casing sections are formed and the entire casing gets longer and longer. By excavating concurrently with ramming or jacking, the risks of a tunnel cave-in or settlement of the face is a possible danger. The production process or the time required for installing the tunnel using jacking or ramming or a combination thereof is impacted by an interruption of having to excavate the pipe interior before another pipe section can be driven.

U.S. Pat. No. 5,632,575 issued May 27, 1997, describes a method and apparatus for controlled piping of bentonite around a pipe-jacked tunnel. Although this patent shows trenchless tunneling, it may use a combination of a tunnel boring machine or even tunnel excavation using hand labor. The system uses a tunnel ram and requires lubrication that presses the limit of the hydraulic jacking. This is a completely different operation than pile driving a tunnel casing great lengths using a horizontal pile driver.

U.S. Pat. No. 4,391,553 issued Jul. 5, 1983, shows a hydraulic control system and method of controlling the operation of tunneling apparatus. This shows the conventional use of a pair of hydraulic rams and pumps. This system is severely limited in total pipe casing achievable distances and operates completely differently than Applicant's invention.

U.S. Pat. No. 4,557,672 issued Dec. 10, 1985, shows an apparatus and method for tunnel construction with shield drive. Again, this is a trenchless tunneling method that is completely different than Applicant's invention. This method uses a shield drive and incorporates a concrete tunnel lining directly behind the shield. This is very slow and expensive.

U.S. Pat. No. 3,742,718 issued Jul. 3, 1973, shows a tube driving apparatus for driving large diameter tubes where a limited amount of space is available. The method and apparatus shown are severely limited in the total trenchless pipe distances available of the tube construction, which is completely different than that disclosed by Applicant's invention.

U.S. Pat. No. 4,398,845 issued Aug. 16, 1983, shows a tunnel driving apparatus that incorporates a cutter shield with a plurality of drive members in a side-by-side, cylindrical array. This system is completely different than that employed by Applicant.

The subject of the present invention overcomes the problems discussed above by providing a method and system that uses a powerful pile driving hammer, like those used for offshore vertical pile driving construction, that greatly increases the length of a trenchless tunnel casing to be driven while greatly reducing the risk of cave-in. With existing jacking/ramming systems, as more tunnel liner sections are installed, the friction between the liner sections and interior and exterior surface and the surrounding soil increases. Due to the limited driving capacity of these systems, this phenomenon requires the interior plug to be removed as each tunnel section is added in order to reduce the upper pushing limit of the typically used jacking equipment.

There is a need for a method and apparatus that has sufficient driving force to drive large sections of tunnel casing, or even the entire tunnel casing, before excavation of the soil plug begins in order to improve safety and production and also allow greater diameter pipe and longer drive lengths in one continuous operation without excavation, thereby reducing the risk of collapse of the face or settlement of the ground. This is important since typically, these installations underground are often planned under busy roadways or railroads (or a combination of both), whereby it is not practical or cost effective or even possible to open cut with open trenches. Thus trenchless tunneling is extremely important in certain environments. With the present invention, the Applicant can use trenchless tunneling to drive underground pipe casing over 72 inches in diameter and up to 168 inches for distances exceeding 100 feet. This can also be done very quickly in a matter of hours instead of days and weeks compared to other methods of trenchless tunneling at greatly reduced cost.

The use of an impact piling (pile driving) hammer (such as a modified Hydrohammer manufactured by IHC) that uses low frequency and high velocity and high energy is preferred over the use of a low energy, low velocity, and high frequency system, such as ramming, in that the soil particles are forcibly sheared with the former and not simply brought in suspension as with the latter. The limitations of pipe ramming/jacking are especially evident for installation done in damp or fluid-bearing soils where the pneumatic ramming can lead to soil liquification that can cause the soil plug to run.

Another advantage of the large capacity available with the low frequency and high velocity and high energy system in accordance with the present invention using a piling hammer is that on particularly environmentally sensitive projects, a hammer of sufficient driving capacity can be chosen so as to eliminate the need to lubricate. Thus, in certain environmental situations, the system avoids environmental contamination when the installation, for example, is near or over fish-bearing creeks. However, if lubrication is permitted, it also allows for even more increased distance that can be obtained using the pile driving hammer in accordance with the present invention.

SUMMARY OF INVENTION

A trenchless tunneling system and method for driving horizontally placed large pipe casings that are joined sequentially together in sections to form a tunnel which is safer and more efficient over current methods. The present invention can provide for the creation of a tunnel using casings of large diameter (over 72 inches) for great lengths (exceeding 100 feet) without digging a trench.

One objective of the invention is to provide a method and system or installation of pipe casings in areas where open cut excavation is not possible or practical, such as under heavily traveled roads, highways, railroads, or any combination thereof.

Another advantage of the large capacity availability with the low frequency and high velocity and high energy system is that on particularly environmentally sensitive projects a hammer of sufficient capacity may be chosen in accordance with the present invention to eliminate the need to lubricate with bentonite or other additives, avoiding environmental contamination.

Another object of the invention is to provide a hammer of sufficient capacity that on less environmentally sensitive projects, especially where tunnel distances are required exceeding 300 feet trenchless, the invention can provide a method and apparatus for providing lubricant, such as bentonite, on the inside or outside or both, for great distances.

And yet another object of the invention is to provide a method that temporarily stabilizes soil at the entry phase of the casing pipe to be installed whenever the entry of the installation is near the shoulder of a road, a railroad embankment, or other structure requiring settlement avoidance.

It is very important that a temporary means of soil support is provided at the leading open end of the pipe as soon as the drive is started to avoid collapse of the soil into the pipe, resulting in loss ground and surface settlement. A temporary seal made up of interlocking steel plates against the cutting shoe form an enclosure at the front end, thus a temporary bulkhead, whilst at a variable distance, dependent upon the soil type to be tunneled, a temporary bulkhead is placed inside the casing to be driven in such a way that the space between the two bulkheads can then be filled with a flowable fill. The rear bulkhead is constructed out of aluminum, and is a shield that uses an inflatable rubber seal of which the friction between the interface with the internal diameter of the casing pipe may be controlled by means of regulating the pressure in the inflatable seal; this bulkhead together with the flowable fill plug forms a controllable resistance that will support the face upon entry, thereby avoiding surface settlement.

In accordance with these and other objects which will become apparent hereinafter, the instant invention will now be described with particular reference to the accompanying drawings.

BRIEF DESCRIPTION OF DRAWINGS

FIG. 2A is a top plan view of the invention.

FIG. 2B is a side elevational view of the invention.

FIG. 4 is a top plan view of the cutting/lube shoe of the present invention.

FIG. 5 is a side view in elevation, partially in cross section and cut away, of the cutting/lube shoe.

DETAILED DESCRIPTION

Figure 1:
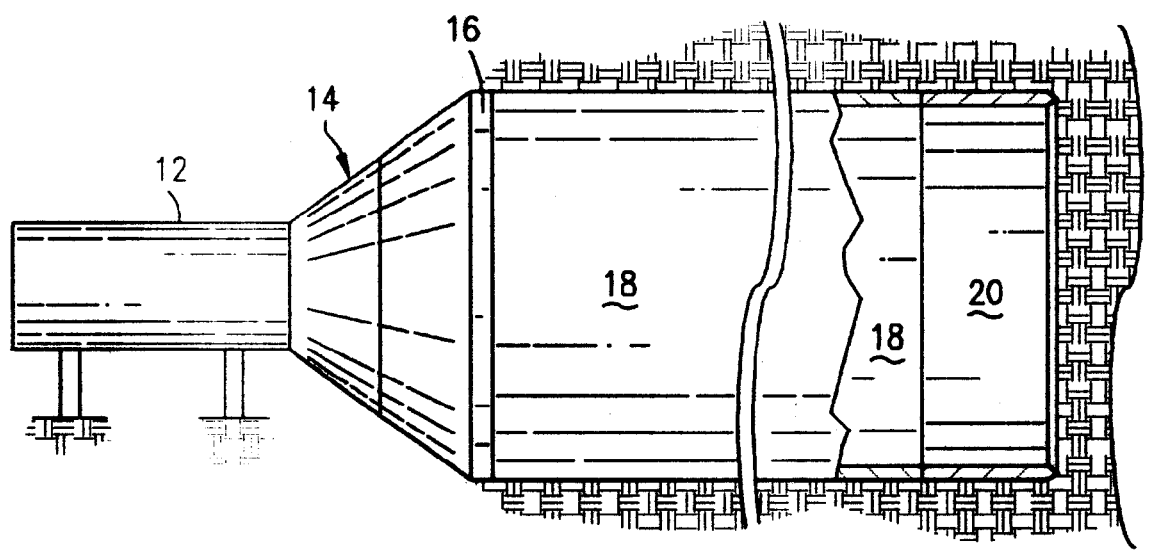
FIG. 1 is a side elevational schematic diagram of the invention.

Referring now to the drawings, and in particular, FIG. 1, a schematic diagram of the invention is shown.

The invention is used to install a large steel pipe casing of up to 168 inches diameter, up to two inches thickness, a distance of at least 250 feet underground without digging a trench to install the pipe. Once the pipe casing has been installed, soil is removed, and the desired final pipe is placed in the casing. This could be a large concrete water or sewerage pipe placed inside the permanent pipe casing. All this is accomplished without digging a trench.

The overall installation involves digging a ground entrance pit and placing a pile driving hammer of significant driving force and a support system horizontally in the pit forming an entrance to the underground tunnel to be driven. The installation requires that the pipe casing be formed by a series of pipe casing segments, each about 30 feet (or smaller) in length, that are sequentially joined (end-to-end) as each pipe casing segment is driven until the desired total length of the pipe casing is achieved underground without a trench. As each section of pipe casing is driven into the earth, a new section is added either by welding or by a coupling device.

A large pile driving hammer 12 is placed in a pit generally horizontally in front of the location where the pipe 18 is to be installed. A pit may be required, although, depending upon the job, a pit may not be necessary. The hammer is placed on a stability framework fixed to the ground to ensure that the hammer head strikes generally evenly. The pile driving hammer is similar to a vertical pile driving hammer modified for horizontal use to compensate for the loss of the "g" force of gravity used by vertical hammers.

As shown in FIG. 1, the driving end of the hammer 12 head strikes a helmet 14 abutting plate 16. The plate 16 is mounted against helmet 14. This helmet, also referred to as the primary helmet, preferably strikes a secondary helmet, which, in its turn, may strike a series of helmets that may be used depending upon the diameter of casing pipe to be driven. The final helmet, when there is a series of helmets, then strikes a drive plate, which in turn strikes the first section of casing pipe 18 to be driven. The lead casing 18 has a cutting head 20 described below. Depending on the soil and application, the cutting head may be steerable. Subsequently when the first casing pipe has been driven, the driving apparatus, including the drive helmets, is withdrawn from the first casing pipe. Next the second casing pipe to be driven is inserted between the final driving helmet and plate and the first casing pipe installed. The connection between the first and second casing pipe may be formed through the use of a proprietary locking joint, or through welding. After the connection between the first and second casing pipe is made, the driving apparatus and helmets with push ring are placed against the driven end of the second casing pipe whereafter the above described driving process is repeated. This sequence will repeat itself until the last casing pipe is driven. Each casing may be up to thirty feet in length.

It is preferred that the hammer head is approximately 24–36 inches in diameter, and the plate is approximately 64 inches in diameter, and preferably made of a rigid material. The hollow helmet or helmets, and the pipe to be inserted, are preferred to be up to approximately 120 inches in diameter and may be 160 or up to 190 inches in diameter.

The hammer 12 is preferably a high energy impact hammer (generally 60,000–260,000 foot/pounds) such as one used in large offshore vertical piling construction projects. In use, the hammer hits approximately 40–60 blows per minute, and can drive 30 feet of large diameter pipe on average in about 35 minutes. However, unlike offshore construction, the hammer is used horizontally rather than vertically. Several elements must be in place to ensure that the hammer operates as intended. Larger hammers may be used as necessary up to 500,000 foot/pounds.

Figure 1A:
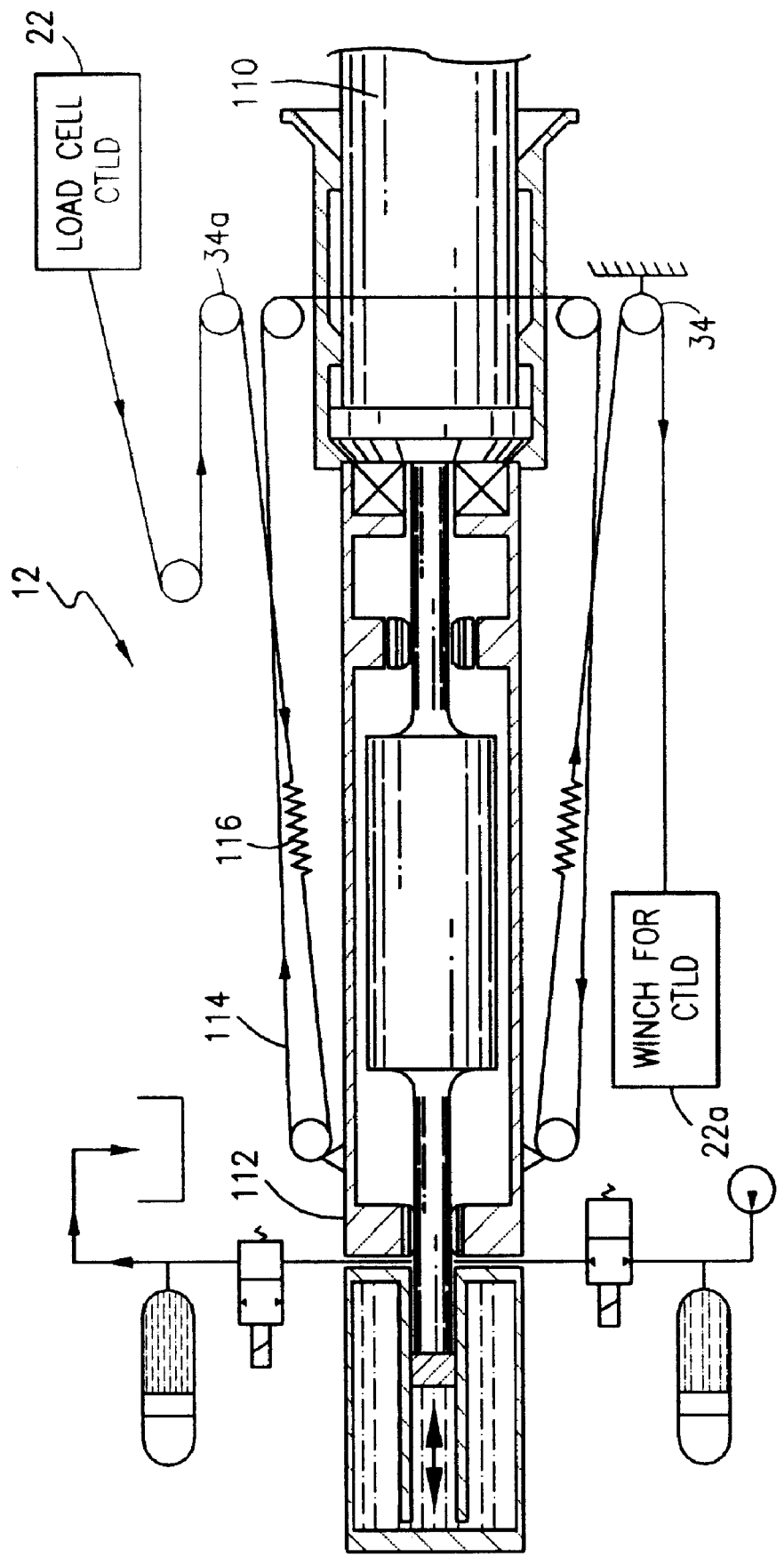
FIG. 1A is a top plan schematic of the pile driving hammer used in the invention.

FIG. 1A shows a schematic diagram of the high force, horizontal pile driver 12 used to drive the pipe casing 110 and the drive hammer set-up when driving horizontally. To counteract against the increased pressure in the gas buffer, a constant tension loading device (pull down force) is required to keep the hammer housing 112 firmly on the anvil. A spring arrangement 116 is located between tension wires 114 and the hammer 118 to prevent too high shock loads in these wires. The system incorporates a winch that includes a plurality of lines and pulleys and springs attached to pulleys that are permanently mounted to the earth to provide the constant tension through a constant tension loading device (CTLD). The pile driving hammer 118 is not in itself the present invention but is the hammer being used that includes improvements for specifically driving pipe casing horizontally to avoid having to dig trenches.

FIGS. 2A and 2B show the present invention which includes the pile driving hammer 12 connected to helmets 14 and pipe casing 18 in the pipe driving position. The hammer is supported on a frame 20. The system includes a tension cable 24, a winch 22 and pulleys 26, 28 and 32 mounted to rigid pilings 34 and 34a. An end cap 30a and cable tension shock absorbing devices 30 hold the hammer in alignment and in tension.

Figure 3:
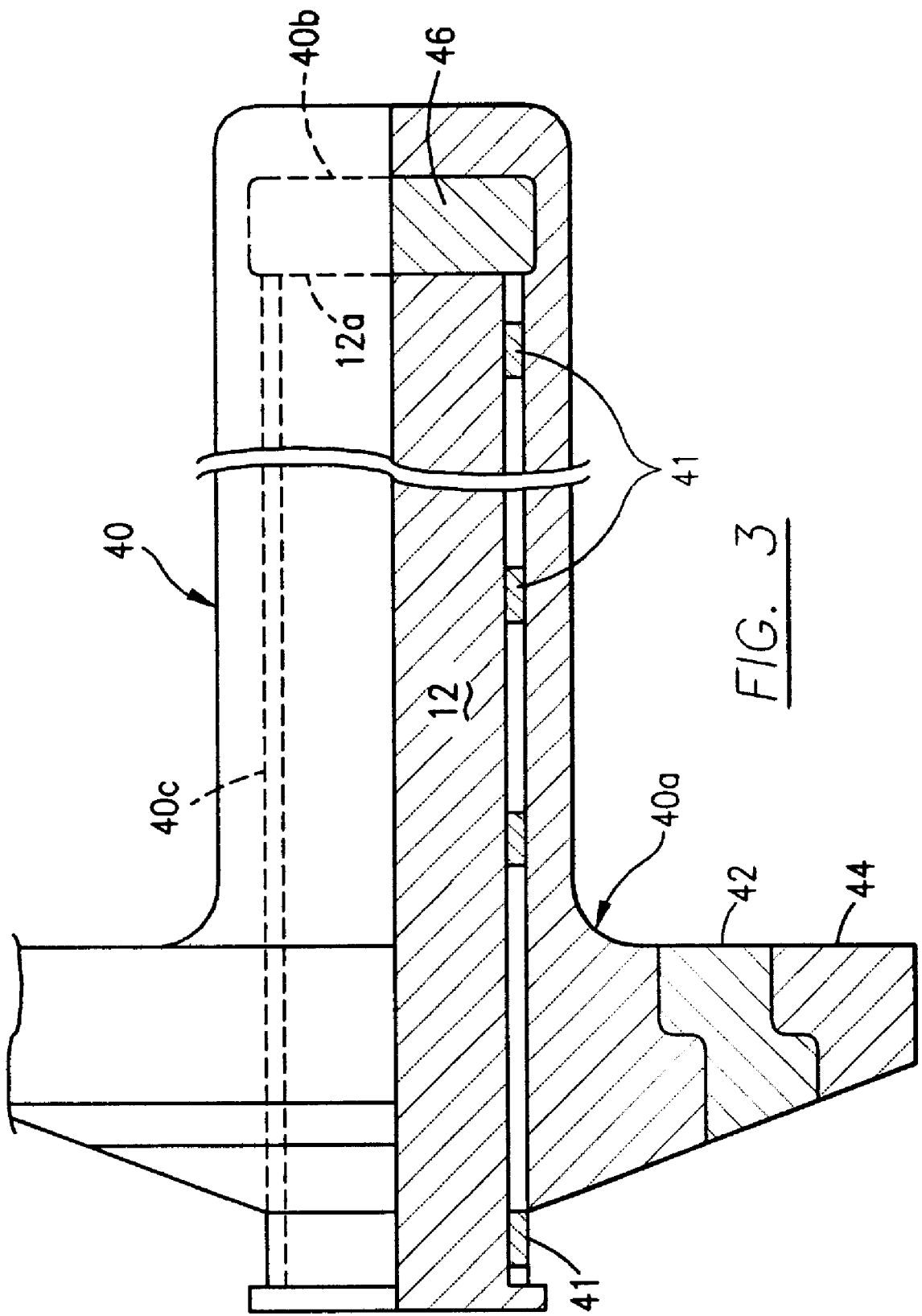
FIG. 3 is a side elevational view partially in cross section of the helmet used in the invention.

FIG. 3 shows a side view of an improved helmet 40 used with the present invention. The use of the improved helmet 40 reduces the overall length required for the pile driving hammer pit in as much as a good portion of the hammer 12 is mounted inside the helmet 40. The helmet 40 itself is mounted partially inside the first casing pipe to be driven. The hammer end 12a strikes interior mounted anvil 46 constructed of TI high carbon material inside the helmet 40. The helmet 40 is an elongated cylindrical cast iron unit that has an elongated circular central chamber 40c that receives the driver hammer 12 which provides the high impact force to anvil 40 positioned permanently inside the helmet interior chamber 40c. The helmet flanged end 40a is conical in shape and makes direct contact with a plate connected directly to the pipe casing section being driven and provides the force transferred from the hammer 12 through the helmet 40 against the entire perimeter edge of the pipe casing being driven. The end of the helmet includes a conical flange portion with an extended circular area that extends beyond the cylindrical outer body of the hammer. The hammer is aligned by a plurality of spacers 41 positioned between the outer hammer 12 body surface and the inside chamber 40c against anvil 46. The flanged conical end 40a of helmet is shaped so as to be able to engage pipe casings of different diameters through, including additional flanged ends 42 and 44 to extend the helmet diameter for larger pipe. Therefore the helmet 40 includes an adjustable sized diameter for different diameter pipes for different jobs without having to create a separate helmet for each different size pipe casing. The helmet itself is made of high-strength cast-iron and sized in length to save approximately 15–20 feet of excavation in the initial hammer installation pit by allowing a significant portion of the hammer to be received inside the helmet and impacting the anvil inside the helmet 40, all while the helmet is partially received inside the first casing pipe.

Referring to FIG. 2A and 2B, the hammer 12 is placed on a ground supporting framework 20. On the back of the hammer 12, a tension bracket 30a incorporating pulleys with shock absorbers are attached. In the preferred embodiment, two pulleys 26 and 28 are firmly attached either directly or indirectly into the ground to pilings 34 generally behind the entry seal. Two other pulleys 31 are firmly fixed in a position generally located near the bracket 30a fixed to the body of the hammer. Depending upon the needs of the project, other pulley and dampening systems may be used. The shock absorbers help dampen the rebound of the hammer as it is used, helps provide a constant tension on the hammer, and helps, stabilize the invention. The pulley system attachment to the piling 34a has a load cell in the dead end of the system so as to be able to maintain a constant tension through out the pulley system. It is preferred that the load cell has a programmable logic controller (PLC) controlling the hydraulic winch 22. The pulley system preferably provides a one to five mechanical advantage.

The impetus for the hammer 12 is preferably provided by a hydraulic cylinder which is actuated by compression of a nitrogen cylinder. However, other force drivers for providing impetus are known in the art.

When the installation of the pipe casing begins, the first thirty foot section of pipe casing is permanently attached at the leading end to a cutting head 20 shown in FIGS. 4, 5, and 7. The cutting head 20 is a tubular or annular—shaped conduit 50 that has a hardened knife blade shaped leading cutting edge 56 around its perimeter cutting through rock and ground as the pipe casing is driven. The blade edge 56 extends around the entire perimeter of the leading edge of the cutting head. The cutting head 20 back perimeter 58 is welded to the leading edge of the first pipe casing that will be driven to begin the tunnel. The cutting head 20 also includes a lubricant dispensing shoe which is used in conjunction with the cutting edge to dispense a lubricant such as Bentonite to reduce the friction between the pipe casing cutting head 20 and the earth, both inside the pipe casing and outside the pipe casing. A particular circumferential lubricant distribution pattern (inside and outside) for certain jobs that are not environmentally sensitive to the lubricant is selected in order to increase the overall total length of pipe casing that can be driven to reduce earth friction on the pipe casing during the pipe driving operations.

There are some operations where the environment is sensitive and cannot use a lubricant because the lubricant should not be dispensed into the soil such as near underground streams. However if lubricant can be used to increase the effective force of the hammer to reduce friction, the result is extending the length of pipe casing that can be driven for any given scenario. In order to supply the lubricant to the cutting head and shoe, there must be two supply pipes, one for supplying the inside of the cutting head and the other to supply the outside of the cutting head with lubricant. As each section of pipe casing is added to the total pipe driven, the lubricant pipes must be welded or attached to the outside of each give casing, with conduit couplings joining the lubricant supply pipes attached between each pipe casing section.

As shown in FIG. 5, cutting head body 50 has an annular groove 64 on the outside of the cutting head. Spacers 62 are attached by welding to the cutting head. The spacers 62 are attached to an annular cover ring 60 that forms an annular chamber around cutting head body 50 that can receive lubricant from supply pipe 52. A second supply pipe 54 is in fluid communication with an interior dispensing channel 70 on the inside wall of cutting head body 50 formed by annular inside groove 70 and annular cover ring 66 attached by spacers 68 to the inside wall of body 50. It is desirous to reduce friction to keep the lowest physical height profile inside and outside the cutting head possible for the lubricant dispensing channels since the dirt is traveling both inside and outside of the cutting head during the entire operation.

Referring now to FIG. 4 the cutting head 50 is shown attached to first and second lubrication supply pipes 52 and 54. The first lubrication conduit 52 is connected through cover plate 60 that can dispense lubricant approximately 120–270 degrees around the outside top perimeter of the cutting head.

The second lubricant supply conduit 54 is shown which has an outlet passage 72 through body 50 on the inside of the cutting head which can also distribute the lubricant approximate 90 degrees around the inside bottom wall of the cutting head in a different arc circumferential pattern than the outside pattern lubricant distribution. The annular plate is mounted on the inside of the cutting head as shown in FIG. 4 attached by spacers 68 welded to the inside of the cutting head surface above and over groove or channel 70 completely around the inside the cutting head body 50. The outlet of the second supply conduit 54 for the lubricant goes through passage 72 and empties into the chamber 70 formed by the inside channel and annular covering 66 for dispensing lubrication on the inside of the cutting head.

Figure 6:
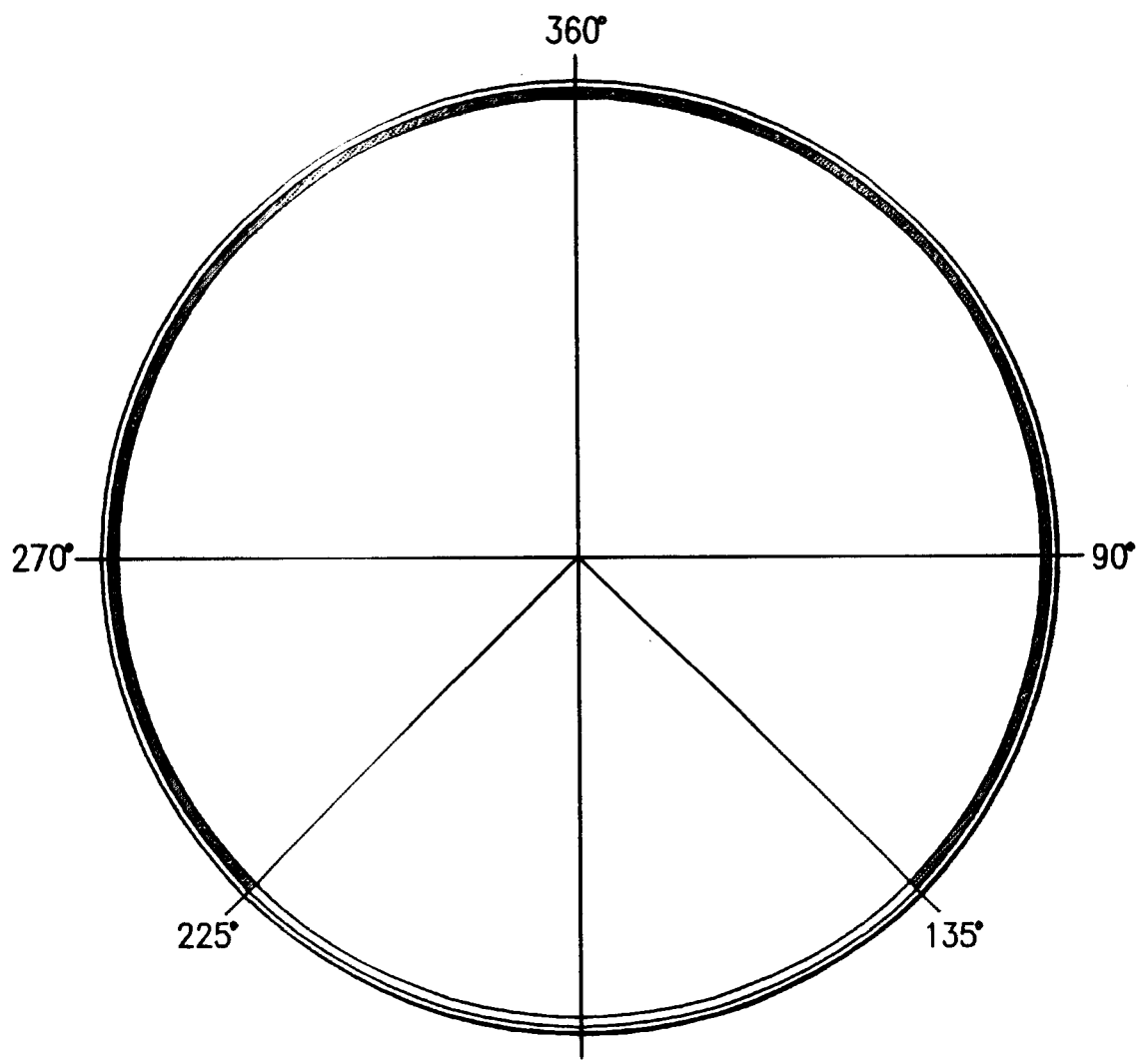
FIG. 6 is a diagram showing the distribution of lubrication around the outside and inside of the pipe casing during installation driving.

Referring now to FIG. 5, the cutting head has a Bentonite lubricant receiving and dispensing chamber 64 on the outside with a protective shoe 74 in front of the first supply conduit 52. Also shown is the connection and outlet from the second supply conduit 54 for supplying lubricant to the inside of the cutting head through the chamber 70 annularly disposed. Note how pointed the blade edge 56 is at the leading end of the cutting head. FIG. 6 shows a circle divided into arc degree segments and the approximate distribution angles for the inside of the pipe and the exterior of the pipe for the dispensing of the Bentonite lubricant. The outside of the pipe has lubricant distributed from 225 degrees to 135 degrees. The inside of the pipe casing has lubricant dispensed from 135 degrees to 225 degrees. Dispensing of the lubricant both on the inside and the outside is dependent upon the number of ports or openings in the outside spacer 62 and the inside spacer 68.

A cutting head 20 is used for cutting through the earth and can include a ground lubrication dispenser shoe. The cutting head 50 is attached to the first lead pipe casing and is used to begin cutting and forming a tunnel. Lubrication if necessary helps break the friction of the soil both inside and outside the cutting head and the pipe casing. The head 50 is tubular in shape, and is blade edged at the annexed rim where initial contact is made with the ground during driving. An outer shoe is angled around outer perimeter of the cutting head. The outer shoe includes dispensing openings. Along the interior perimeter of the cutting head is an inner shoe, angled to reduce friction through the earth for a low physical height profile. The inner shoe dispensing openings extends approximately from the four o'clock position to the eight o'clock position when looking directly at the head.

The inner dispensing shoe and the outer dispensing shoe are preferably welded onto the cutting head. The dispensing pressure of the bentonite lubricant is preferably approximately 60 pounds per square inch and the pressure is preferably adjustable.

Along the top body of the casing pipe going to the shoes are two conduits for a lubricant, such as bentonite. One conduit is for outside dispensing and the other for inside dispensing. The bentonite or its equivalent is pumped into the shoes and around the head through the two separate circuits. When bentonite is used, it is preferable that the bentonite is of a wallpaper paste consistency. As pipe casing sections are attached behind the cutting head, it is preferred that two supply pipes for the lubricant are attached to each new pipe casing section. The attachment to the pipe casing is preferred to be a saddle for the conduit on the outside and inside of the pipe section. It is also preferred that the conduits are welded in place. The conduits are preferred to be attached to each other in series as pipe casings are added, and attached to the dispensing shoes on the cutting head.

Since the cutting head is hollow, a plug of soil is formed. In one embodiment, a plug of soil retention material is placed in the casing pipe behind the cutting head and before the hammer begins operation. Thus, the soil does not easily fall back in repose as it naturally would thereby causing undesirable inflow of soil at the point of entry of the installation trench, thus causing unwanted settlement of the surface. It is also preferred that the plug comprises flowable fill material. In another embodiment, equipment such as tunnel digging machinery as shown in the attached drawings is used to excavate the soil in the tubing.

It may be preferable to have a preparation area for the hammer, especially where the conduit is to be installed at least partly underground. In that case, a pit surrounded by steel plates as shown in the attached figures may be placed around the hammer of the invention.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A method of trenchless tunneling for large diameter pipe casings over long distances comprising the steps of:

a. employing a pile driving hammer horizontally to drive at least one section of a large pipe casing having a diameter that exceeds 70 inches using high energy low frequency and high velocity; and b. joining sections of pipe casing together sequentially that are driven by said pile driving hammer to form a tunnel trenchlessly underground for distances exceeding 100 feet.

2. The method as in claim 1, including:

c. providing a cutting head attached to said first section of pipe casing.

3. The method of trenchless tunneling as in claim 2:

d. lubricating the outside and the inside of said pipe casing during said pile driving to reduce the friction on the pipe casing.

4. The method of trenchless tunneling as in claim 1 including:

e. providing a tension dampening system for said pile driving hammer to absorb energy of recoil during said pipe casing section pile driving.

5. The method of trenchless tunneling as in claim 1, including:

f. providing a pile driving hammer anvil connected between the pile driving hammer and the pipe casing section being driven that is sized to be used with different diameter pipes.

6. A method of creating a trenchless tunnel for large diameter pipes using pipe casing larger than 72 inches in diameter and capable of installing at least 100 feet of pipe casing comprising the steps of:

a. providing a pit generally horizontally in front of the location where pipe casing is to be installed;

b. disposing a large pile driving hammer within said pit horizontally;

c. attaching a first section of pipe casing having a diameter of at least 72 inches in length to a helmet, and attaching said helmet to the driving end of said pile driving hammer, said hammer being a high energy impact hammer that exceeds 60,000 foot pounds;

d. attaching a cutting head to one end of said pipe casing to be driven in the earth;

e. providing a constant tension to keep a hammer housing firmly attached to an anvil;

f. driving said first section of pipe casing having a cutting edge attached to one end until a sufficient amount of said first pipe casing section is embedded in the earth;

g. attaching subsequent pipe casings to said first pipe casing creating a pipe casing tunnel of pipe casing sections joined together that exceed 100 feet in the earth.

7. The method as in claim 6 including the steps of:

h. providing a first lubrication distribution about said first pipe section on the exterior of the pipe casing around a pre-determined arc measurement to reduce exterior earth friction on said pipe casing during hammering; and i. providing a second lubricant distribution system mounted inside of said first pipe casing section for distributing a lubricant around the inside of said pipe in accordance with a particular arc of distribution to reduce friction on the inside of said pipe during pipe casing driving.

8. A method as in claim 7 including the steps of:

j. attaching an anvil having a pre-determined diameter from engagement of said pipe casing section to be driven and said hammer including a anvil diameter sections that can be adjusted to accommodate pipes of different diameters during driving.

9. A system for laying a trenchless tunnel that can use large pipe casings exceeding 72 inches in diameter for distance exceeding 100 feet to in the ground comprising:

a. a high energy pile driving hammer that can deliver at least 40,000 foot pounds of driving force;

b. means for providing a constant tension on said hammer and said an anvil to adjust to the recoil of said hammer when a pipe casing section is driven;

c. a helmet sized in diameter to engage one end of a pipe section to be driven in conjunction with a plate and the other end of said helmet attached to said hammer;

d. a tubular conduit that includes a knife-like forward edge for cutting through the earth sized in diameter to be attached to the first section of pipe casing to be driven for efficiently cutting through the earth;

e. whereby said high energy hammer is used to drive successive sections of pipe casing attached together in conjunction with the cutting edge through the earth horizontally for distances exceeding 100 feet using pipe casings that exceed 72 inches in diameter.

10. A system for laying trenchless tunnels as in claim 9 including:

f. means attached to said cutting head for distributing a lubricant on the outside of said pipe casing and on the inside of said pipe casing in accordance with a pre-determined arc lubrication distribution pattern on the outside of said pipe casing and on the inside of said pipe casing for reducing friction on the pipe casing during the hammer operation.

11. A system for laying trenchless tunnels as in claim 9 including:

f. said helmet including a flanged conical end that includes a means for adjustably sizing the diameter of the helmet to accommodate different diameter pipes without requiring a separate individual helmet for each different size pipe casing diameter and including an internal channel for receiving said pile driving hammer portion to reduce the length of initial pit required to accommodate the pile driving hammer.

\* \* \* \* \*